(12) United States Patent
Moss et al.

(10) Patent No.: US 6,449,351 B1
(45) Date of Patent: *Sep. 10, 2002

(54) METHOD AND SYSTEM OF PROVIDING CALLER IDENTIFICATION WITH NAME

(75) Inventors: John Wesley Moss, Lake Zurich; Richard John Ebel, Algonquin; James Daniel Kovarik, Batavia; Teresa Farias Latter, Kildeer, all of IL (US)

(73) Assignee: Ameritech Corporation, Hoffman Estates, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,460

(22) Filed: Oct. 28, 1999

(51) Int. Cl.[7] ............................. H04M 1/56; H04M 3/00
(52) U.S. Cl. ............................. 379/142.09; 379/142.03; 379/245
(58) Field of Search ............................. 379/93.17, 93.23, 379/114, 229, 230, 142, 243, 245, 246

(56) References Cited

U.S. PATENT DOCUMENTS

| | | | | |
|---|---|---|---|---|
| 5,724,409 A | * | 3/1998 | Malik et al. | 379/142 |
| 5,734,706 A | * | 3/1998 | Windsor et al. | 379/142 |
| 5,754,636 A | * | 5/1998 | Bayless et al. | 379/142 |
| 5,832,072 A | * | 11/1998 | Rozenbit | 379/246 |
| 5,864,612 A | * | 1/1999 | Strauss et al. | 379/142 |
| 5,892,821 A | | 4/1999 | Turner | 379/220 |
| 5,901,209 A | * | 5/1999 | Tennenbaum et al. | 379/142 |
| 5,940,484 A | * | 8/1999 | DeFazio et al. | 379/142 |
| 5,953,399 A | | 9/1999 | Farris et al. | 379/201 |
| 5,974,128 A | * | 10/1999 | Urban et al. | 379/207 |

FOREIGN PATENT DOCUMENTS

| | | | | |
|---|---|---|---|---|
| JP | 41105511 A | * | 2/1999 | H04Q/7/14 |

* cited by examiner

Primary Examiner—Binh Tieu
(74) Attorney, Agent, or Firm—Dale B. Halling

(57) ABSTRACT

A system (20) for providing a caller identification with name service includes a destination service switching point (22) having a plurality of destination numbers (24). A switching control point (26) has a caller identification with name database (30) and a customer caller identification with name database (32). A signaling system seven link (28) connects the destination service switching point (22) to the switching control point (26).

17 Claims, 11 Drawing Sheets

METHOD AND SYSTEM OF PROVIDING CALLER IDENTIFICATION WITH NAME

FIELD OF THE INVENTION

The present invention relates to caller identification methods and more particularly to a method of providing caller identification with name within a customer group.

BACKGROUND OF THE INVENTION

Caller identification (Caller ID) systems provide the subscriber with the telephone number of the incoming call. In addition, these systems provide the date and time of the call and the caller's name. However, present caller ID methods do not provide the name of the caller when the caller is inside of a corporation. When the caller is inside a corporation the caller ID system passes along only the corporation (organization) name. This information may be helpful if the call is placed outside the corporation, but when the call is within the corporation the information is not very helpful.

One solution has been to locate a name list for the corporation in a central office switch. When a call is placed within the same corporation (centrex group), the switch does a lookup on a database associated with the corporation and passes along the caller's name. Unfortunately, this only works for the corporation's telephones connected to a single switch. A call requiring transfer between two central office switches will only provide the corporation's name.

Thus there exists a need for a method of providing caller ID with name within a customer group that works across multiple central office switches or between LATAs (Local Access Transport Area).

DETAILED DESCRIPTION OF THE DRAWINGS

The invention is a method of providing caller identification with name within a customer group. In one embodiment of the invention a user dials a destination telephone number. A call to the destination telephone is received at a service switching point and triggers. A query is sent to a switching control point. The switching control point performs a lookup in a custom caller identification with name database. When the lookup returns a caller name, a response is transmitted to the service switching point that includes the caller name. The call to the destination telephone number is terminated and the caller name is forwarded to the destination telephone number.

Figure 1:
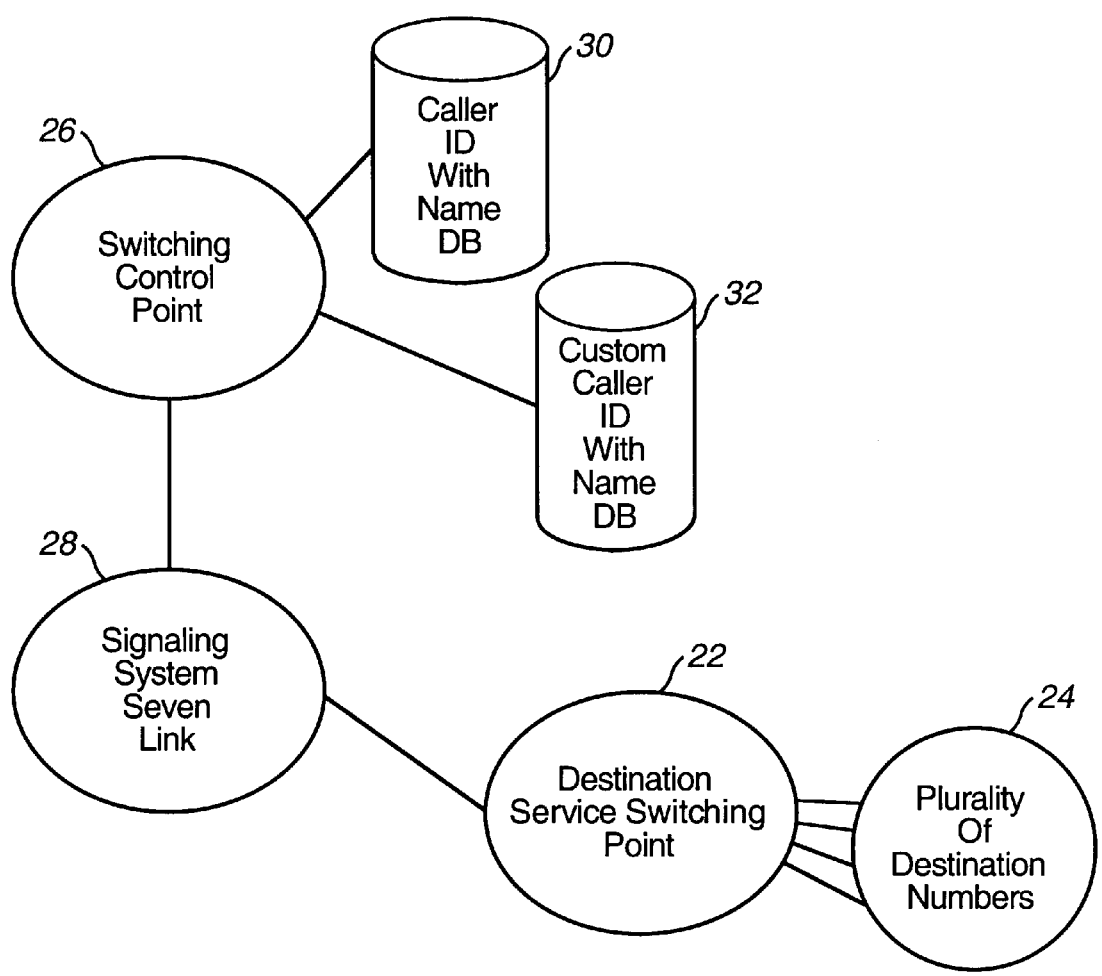
FIG. 1 is a block diagram of a telephone system capable of implementing the invention in accordance with one embodiment of the invention.

FIG. 1 is a block diagram of a telephone system 20 capable of implementing the invention in accordance with one embodiment of the invention. A destination service switching point (SSP) 22 has a plurality of destination numbers 24. The destination SSP 22 is connected to a switching control point (SCP) 26 by a signaling system seven (SS7) link 28. The SCP 26 has a caller ID with name database 30 and a custom caller ID with name database 32. Standard caller ID with name service results in a trigger when a call is placed to a telephone number 24 subscribing to the service. The SSP 22 sends a query to the SCP 26 requesting caller ID information. The SCP 26 does a lookup on the caller ID with name database 30 and passes the caller's name, telephone number, date and time to the customer's telephone. Unfortunately, as explained above, the customer only receives an organization's name when the call is placed from an organization. Part of the reason for this is that large organizations lease a group of telephone numbers and hand these out to employees. As a result, the service provider does not have the name information. In addition, organizations have a tendency to move employees to new telephone numbers regularly.

The present invention allows an organization to provide employee names (caller's name) for calls within the organization. Calls placed outside the organization will only receive the organization's name. The organization provides a plurality of destination telephone numbers that are to receive this service. When a call is placed to one of the plurality of destination numbers, the SSP 22 triggers. The SSP sends a query to the SCP 26 requesting customer caller ID with name information. The SCP 26 performs a database lookup in the custom caller ID with name database 32. When the call is within the organization, the lookup finds the employee's name. The SCP 22 then sends a response to the SSP 22 that includes the employee's name. This information is forwarded to the destination telephone.

Figure 2:
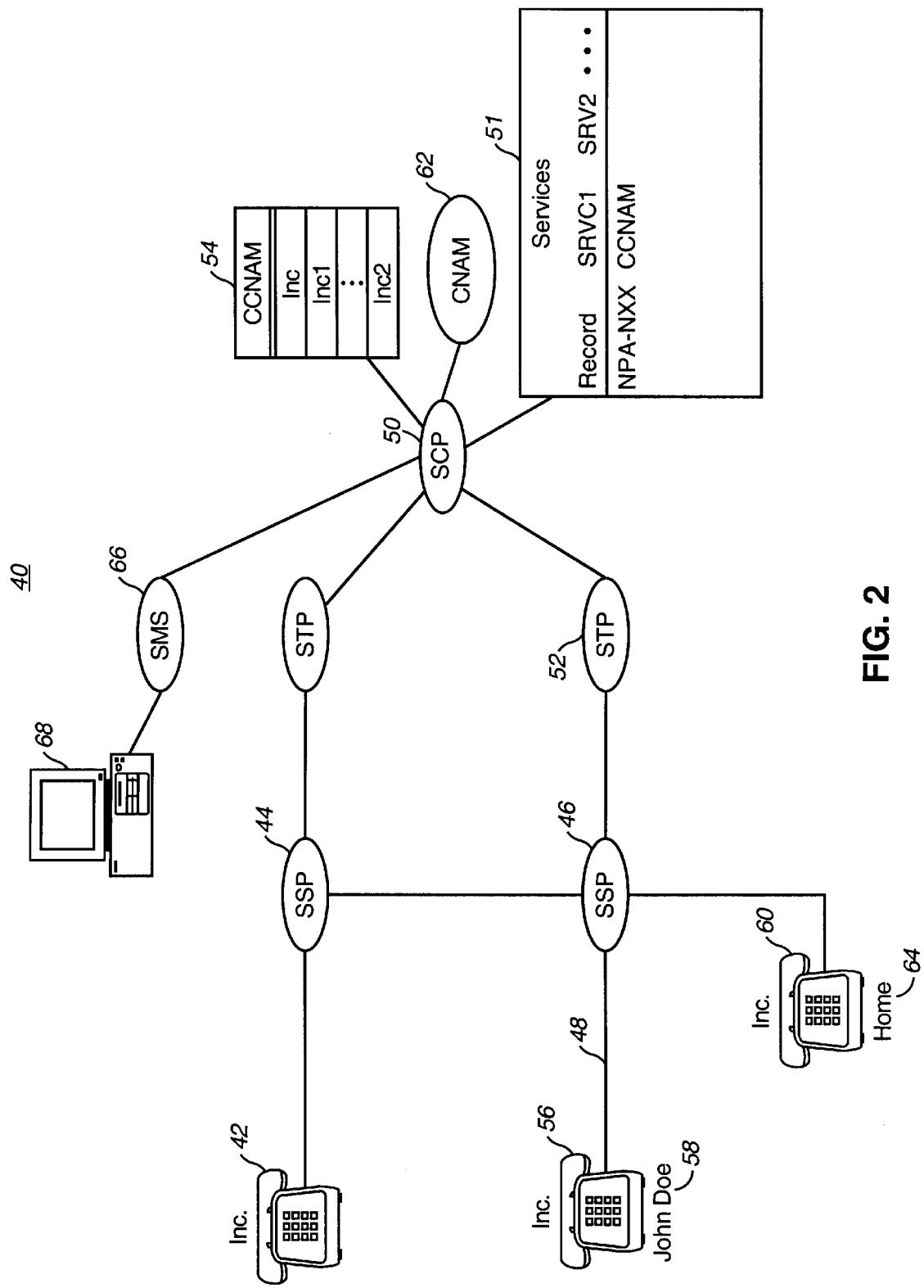
FIG. 2 is a block diagram of a telephone system capable of implementing the invention in accordance with one embodiment of the invention.

FIG. 2 is a block diagram of a telephone system 40 capable of implementing the invention in accordance with one embodiment of the invention. A calling telephone number 42 dials a destination telephone number. This information is received at an originating SSP 44. The SSP 44 routes the call to a destination SSP 46. When the call is within the same organization, then the destination telephone number 48 causes the SSP 46 to perform a termination trigger. The SSP 46 sends a query to a SCP 50 through a signal transfer point (STP) 52. The SCP 50 determines the services subscribed to by the telephone line 48 by finding the telephone line 48 in a services database 51. In this case the services database 51 shows that the destination number subscribes to custom caller ID with name service. The SCP 50 performs a lookup on the CCNAM (Custom Caller identification with NAMe) 54. The CCNAM 54 is a partitioned database so the lookup is only in the partition associated with the destination telephone number. If the calling telephone number is in the database, then the employee's name is forwarded to the SCP 50. This information is then forwarded to the destination telephone 56. The employee's name is shown in the display 58.

Had the call been placed outside the organization such as a residential telephone 60 the lookup in the services database 51 would show that the telephone number 60 subscribes to the standard caller ID with name service. The SCP performs a lookup in the CNAM (Caller ID with NAMe) database 62. The CNAM database 62 only provides the organization's name. The organization's name is shown in the display 64 of the telephone 60. In one embodiment, a customer enters user's names and telephone numbers. A service management system (SMS) 66 has a monitor 68 for entering the names. The SMS 66 is connected to the SCP 50.

Figure 3:
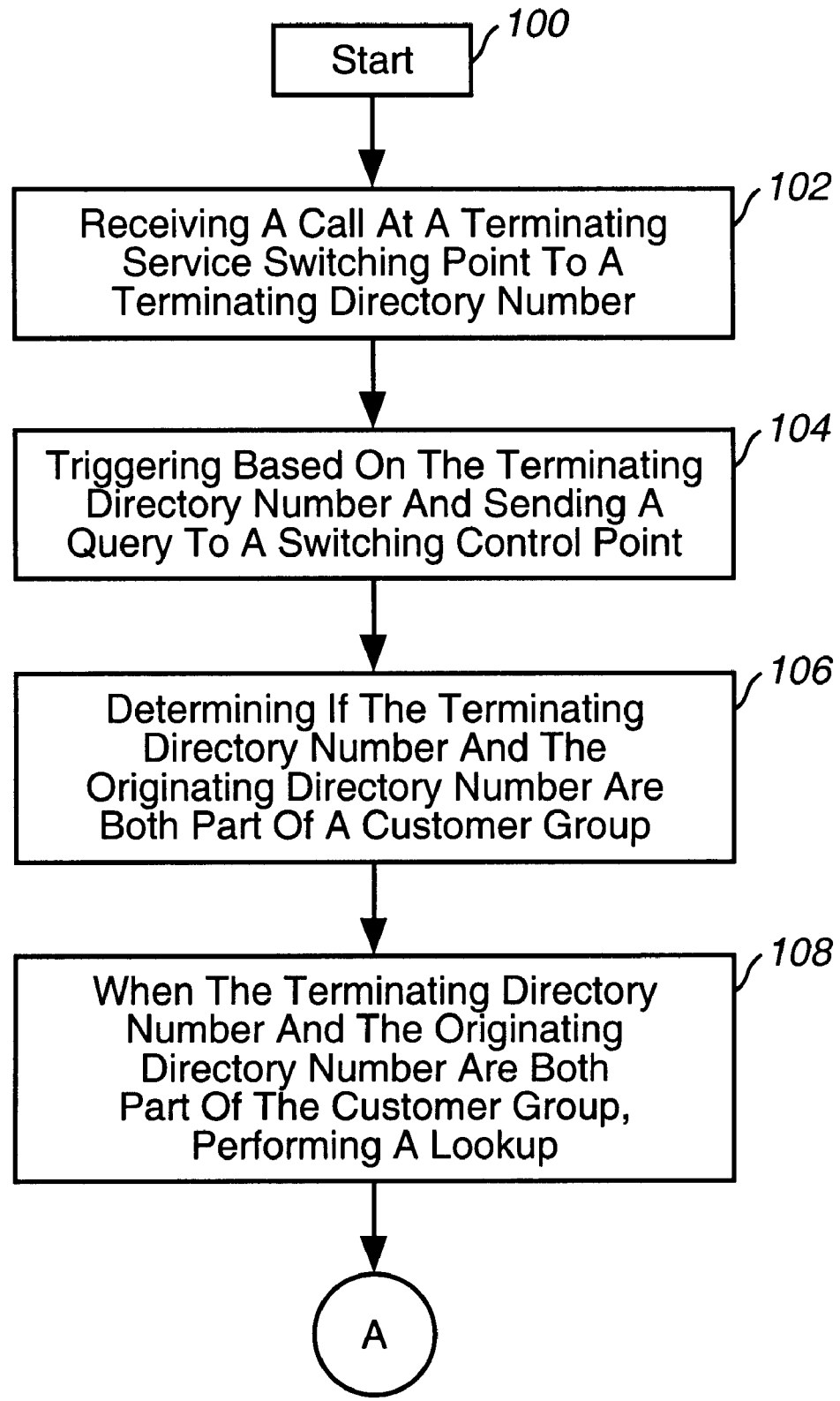
FIGS. 3 & 4 are a flow chart of the steps in a method of providing caller identification with name within a customer group in accordance with one embodiment of the invention.
Figure 4:
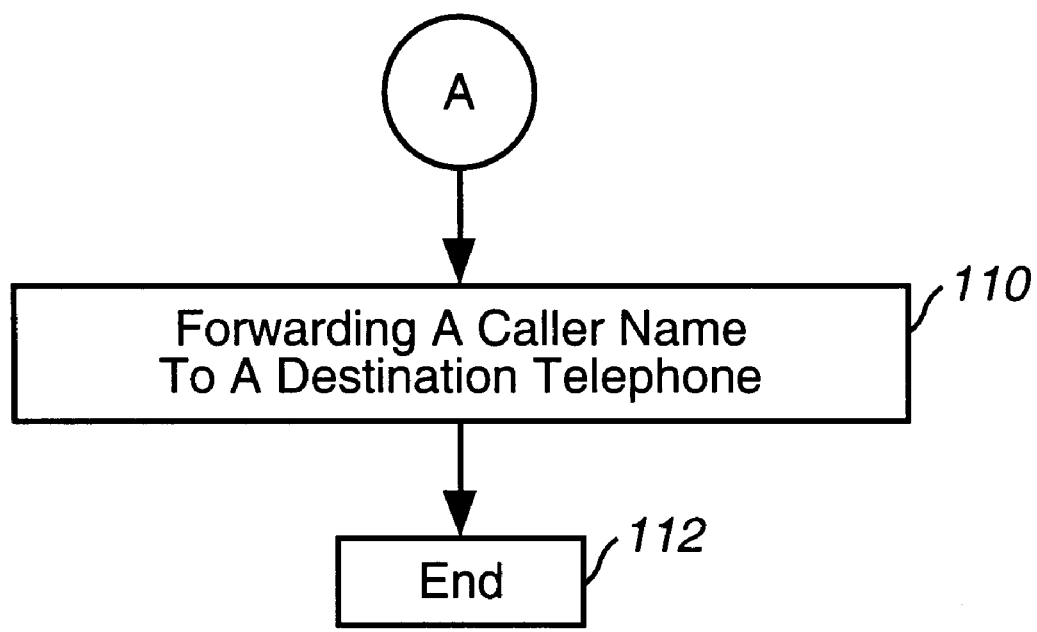

FIGS. 3 & 4 are a flow chart of the steps in a method of providing caller identification with name within a customer group in accordance with one embodiment of the invention. The process starts, step 100, by receiving a call at a terminating service switching point (SSP) to a terminating directory number at step 102. The SSP triggers on the terminating directory number and sends a query to a switching control point (SCP) at step 104. The SCP determines if the terminating directory number and the originating directory number are both part of a customer group at step 106. When the terminating directory number and the originating directory number are both part of a customer group, a lookup is performed at step 108. At step 110 a caller name is forwarded to a destination telephone which ends the process at step 112.

In one embodiment, when the lookup does not return the caller name, a caller identification with name lookup is performed. A response with the customer group name is sent to the service switching point.

In one embodiment, when the calling party directory number is not in the customer caller identification with name database, the caller identification with name lookup is performed.

In one embodiment the destination service switching point, executes a termination attempt trigger based on the destination telephone number.

In one embodiment the SCP determines if the destination telephone number has a custom calling name subscription. When the destination telephone number has the custom calling name subscription, a customer group is determined based on the destination telephone number. A lookup is performed on a partition of the custom call identification with name database associated with the customer group.

In one embodiment a plurality of user names associated with a plurality of telephone numbers in the customer group are entered.

Figure 5:
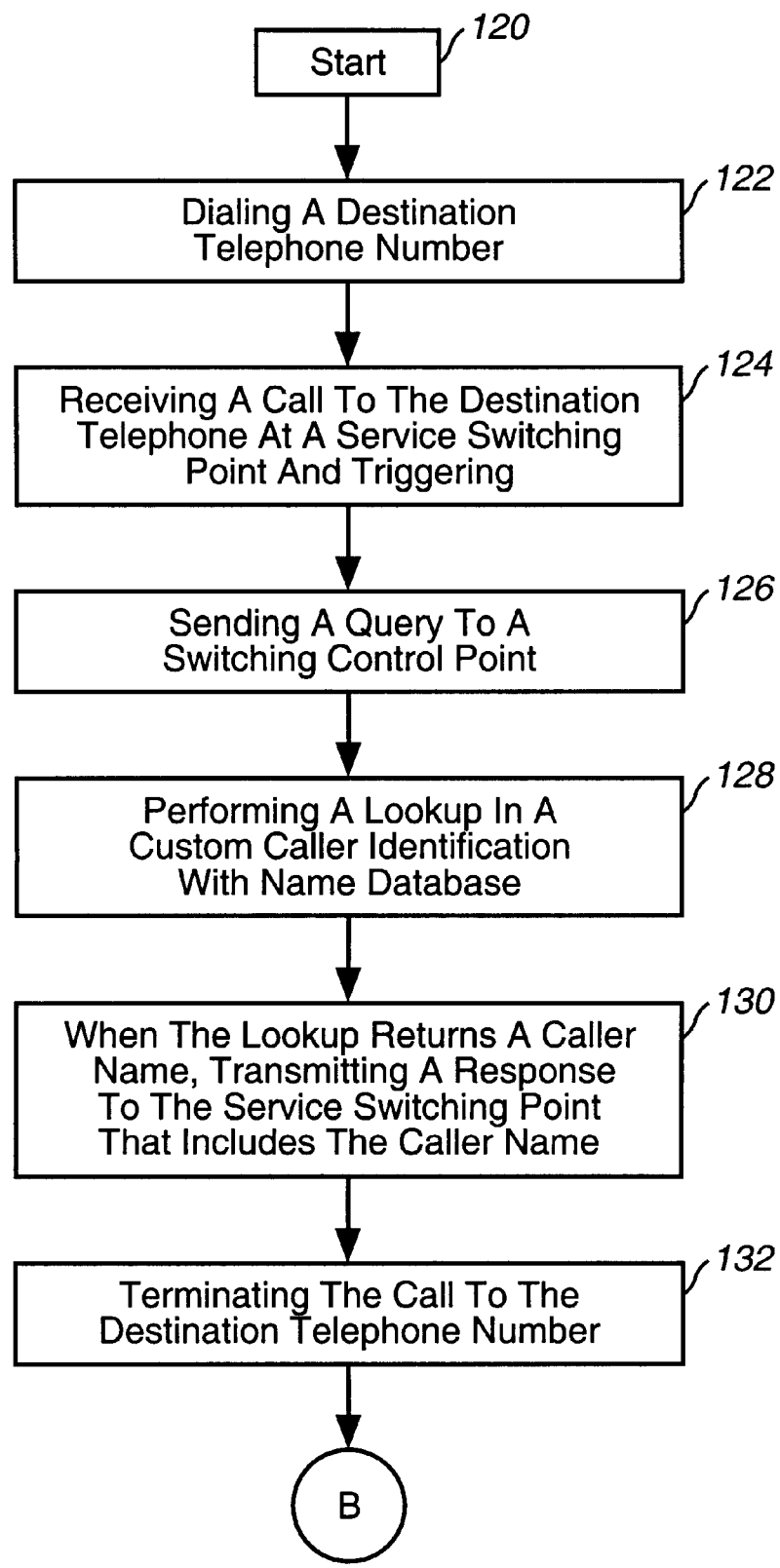
FIGS. 5 & 6 are a flow chart of the steps in a method of providing caller identification with name within a customer group in accordance with one embodiment of the invention.
Figure 6:
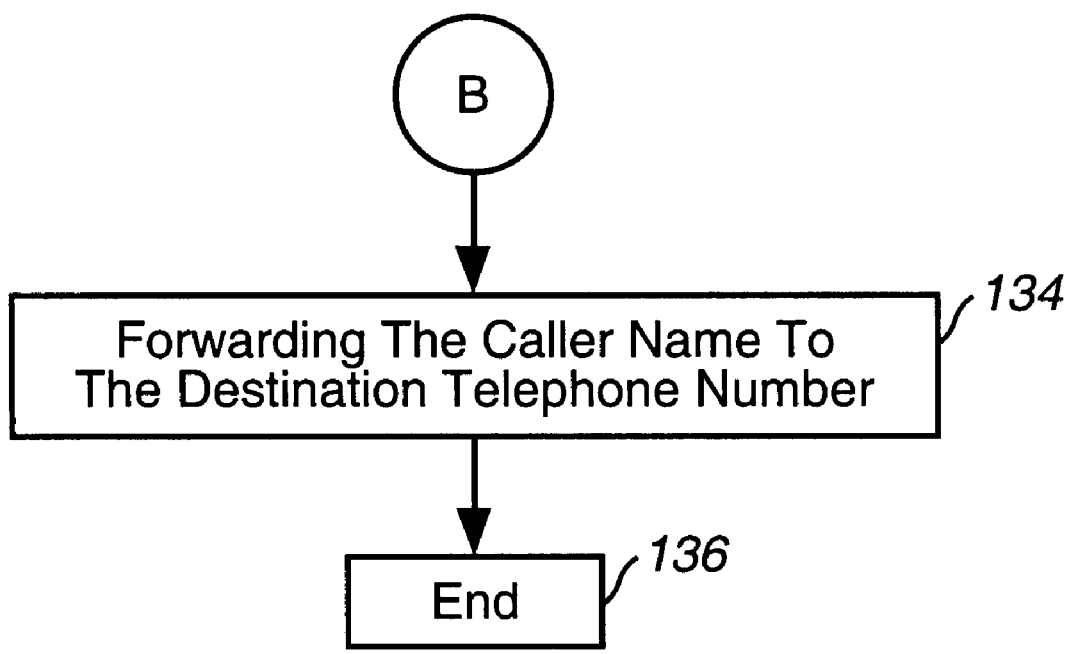

FIGS. 5 & 6 are a flow chart of the steps in a method of providing caller identification with name within a customer group in accordance with one embodiment of the invention. The process starts, step 120, by dialing a telephone number at step 122. A call to the destination telephone is received at a service switch point. The service switching point triggers at step 124. A query is sent to the switch control point at step 126. A lookup is performed in a custom caller with name database at step 128. When the lookup returns a caller name, a response that includes the caller name is transmitted to the service switching point at step 130. The call is terminated to the destination telephone number at step 132. At step 134 the caller name is forwarded to the destination telephone number which ends the process at step 136. In one embodiment, when the terminating director number and the originating directory number are not both part of the customer group, an organization name is forwarded to the destination telephone number.

In one embodiment the SCP determines if the terminating directory number has a custom calling name subscription. When the terminating directory number has a custom calling name subscription, a customer group is determined based on the destination telephone number. A lookup on a partition of the custom caller identification with name database associated with the customer group is performed. When the destination telephone number does not have the custom calling name subscription, a lookup is performed on a caller identification with name database. When the lookup on the partition of the customer caller identification with name database does not find a calling destination number, a response is sent with a customer group name. When the lookup on the partition of the custom caller identification with name database does not find a name associated with calling destination number, a customer group name is sent.

Figure 7:
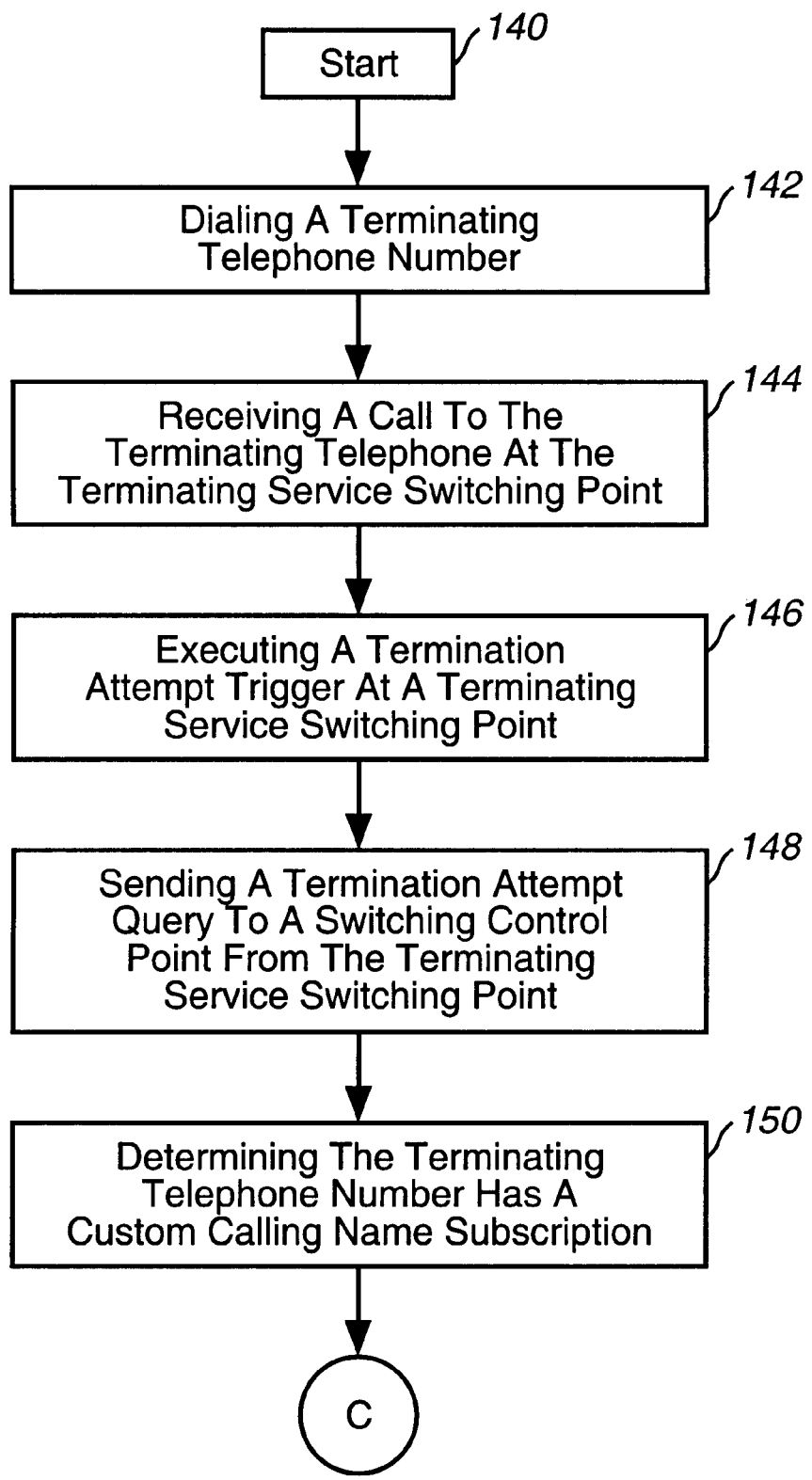
FIGS. 7–9 are a flow chart of the steps in a method of providing caller identification with name within a customer group in accordance with one embodiment of the invention.
Figure 8:
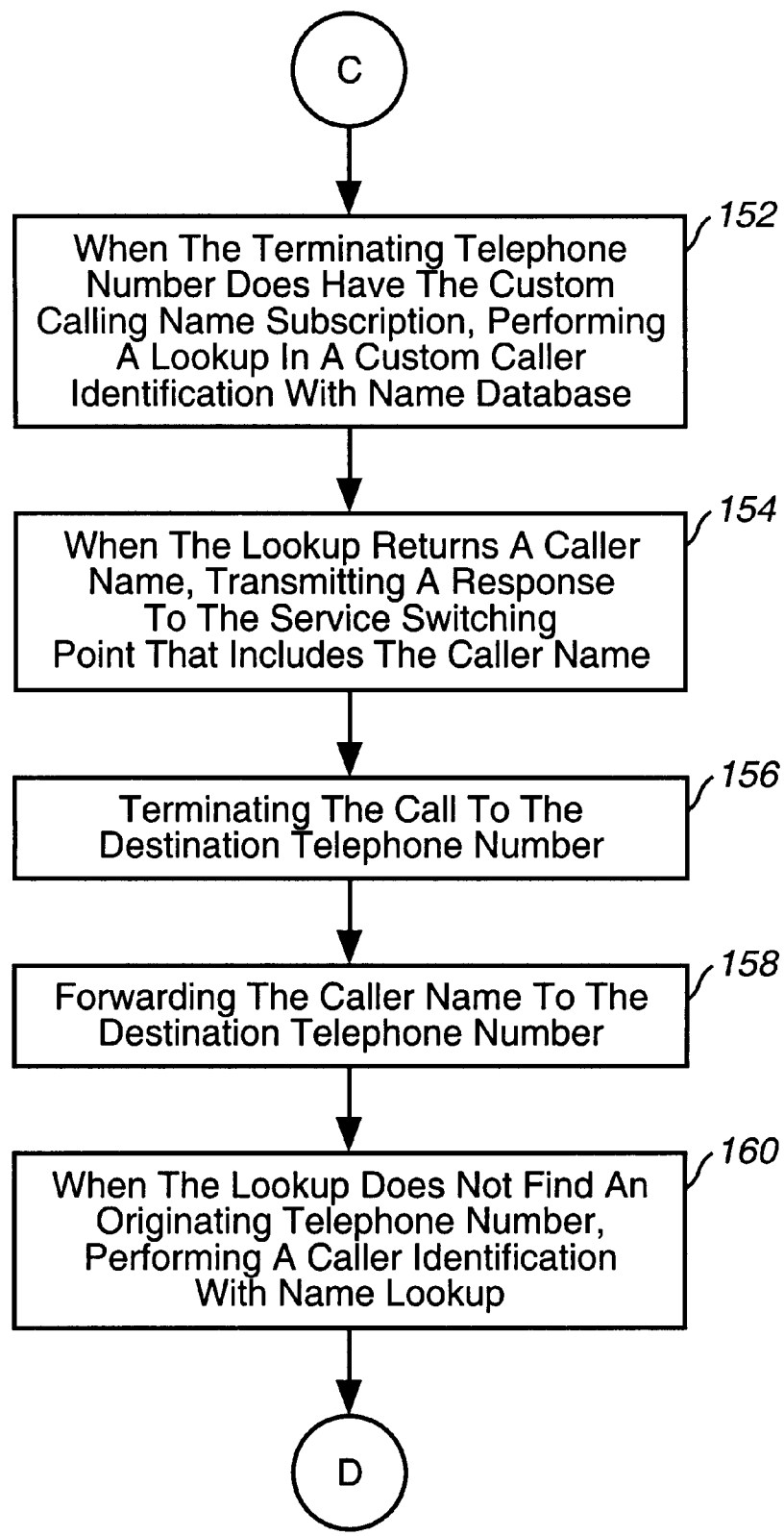
Figure 9:
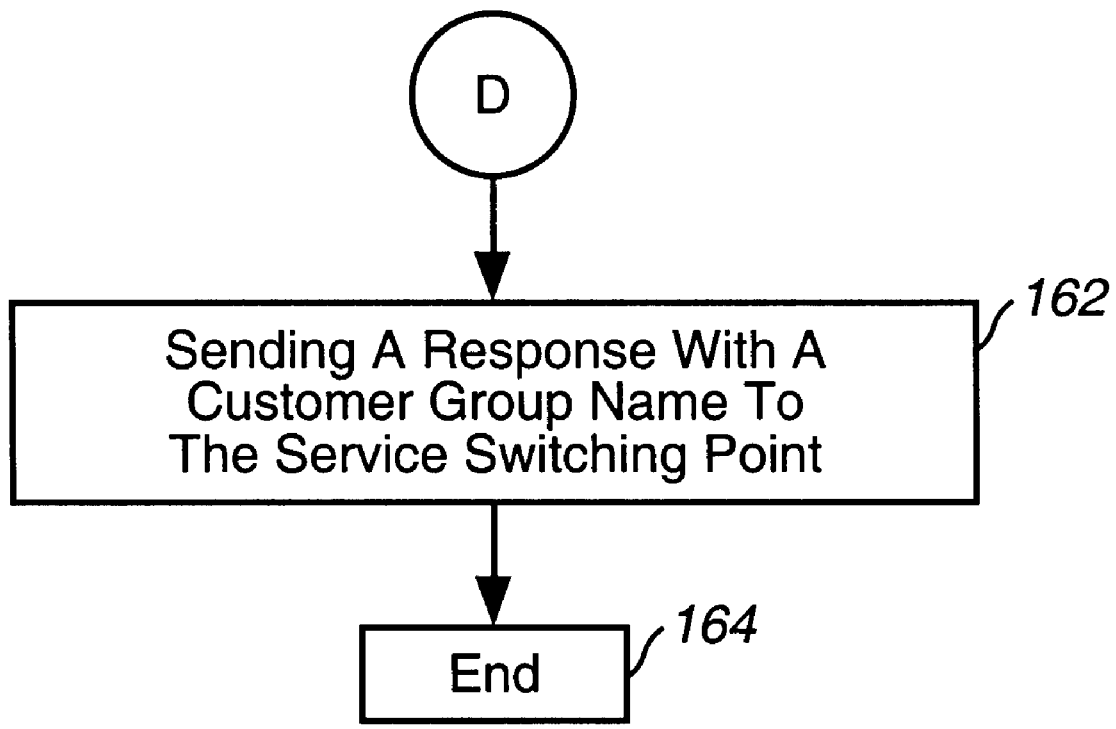

FIGS. 7–9 are a flow chart of the steps in a method of providing caller identification with name within a customer group in accordance with one embodiment of the invention. The process starts, step 140, by dialing a terminating telephone number at step 142. A call to the terminating telephone number is received at a terminating service switching point at step 144. A termination attempt trigger is executed at the terminating service switching point at step 146. A termination attempt query is sent to a switching control point from the termination service switching point at step 148. The SCP determines if the terminating telephone number has a custom calling name subscription at step 150. When the terminating telephone number does have the custom calling name subscription, a lookup in a custom caller identification with name database is performed at step 152. When the lookup returns a caller name, a response is transmitted to the service switch point that includes the caller name at step 154. The call to the destination telephone number is terminated (connected) at step 156. The caller name is forwarded to the telephone number at step 158. When the lookup does not find an originating telephone number, a lookup is performed on the caller identification with name lookup at step 160. At step 162 a response is sent with a customer group name to the service switching point which ends the process at step 164.

Figure 10:
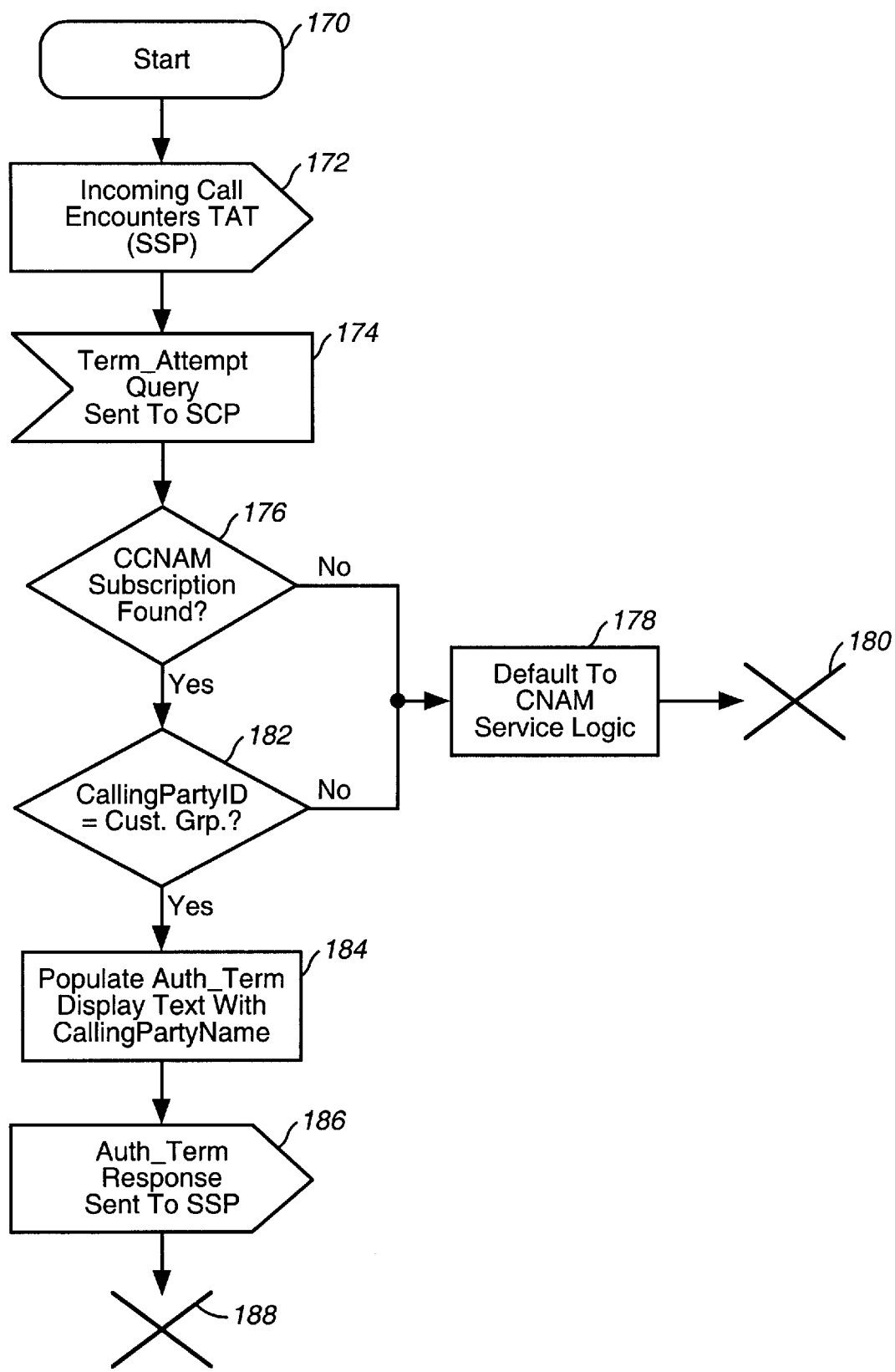
FIG. 10 is a flow chart of the steps in a method of providing caller identification with name within a customer group in accordance with one embodiment of the invention.

FIG. 10 is a flow chart of the steps in a method of providing caller identification with name within a customer group in accordance with one embodiment of the invention. The process starts, step 170, by an incoming call encountering a TAT (Termination Attempt Trigger) at the SSP at step 172. A termination attempt query is sent to the SCP at step 174. The SCP determines if a CCNAM (Custom Caller identification with NAMe) subscription is found at step 176. When no subscription is found the process defaults to CNAM (Caller identification with NAMe) service logic at step 178. The process then terminates at step 180.

When the CCNAM subscription is found, it is determine if the calling party ID is the same as the customer group at step 182. When the calling party ID is not the same as the customer group, the process proceeds to step 178. When the calling party ID is the same as the customer group, the authorize termination display test is populated with the calling party name at step 184. At step 186, the authorize termination response is sent to the SSP which ends the process at step 188.

Figure 11:
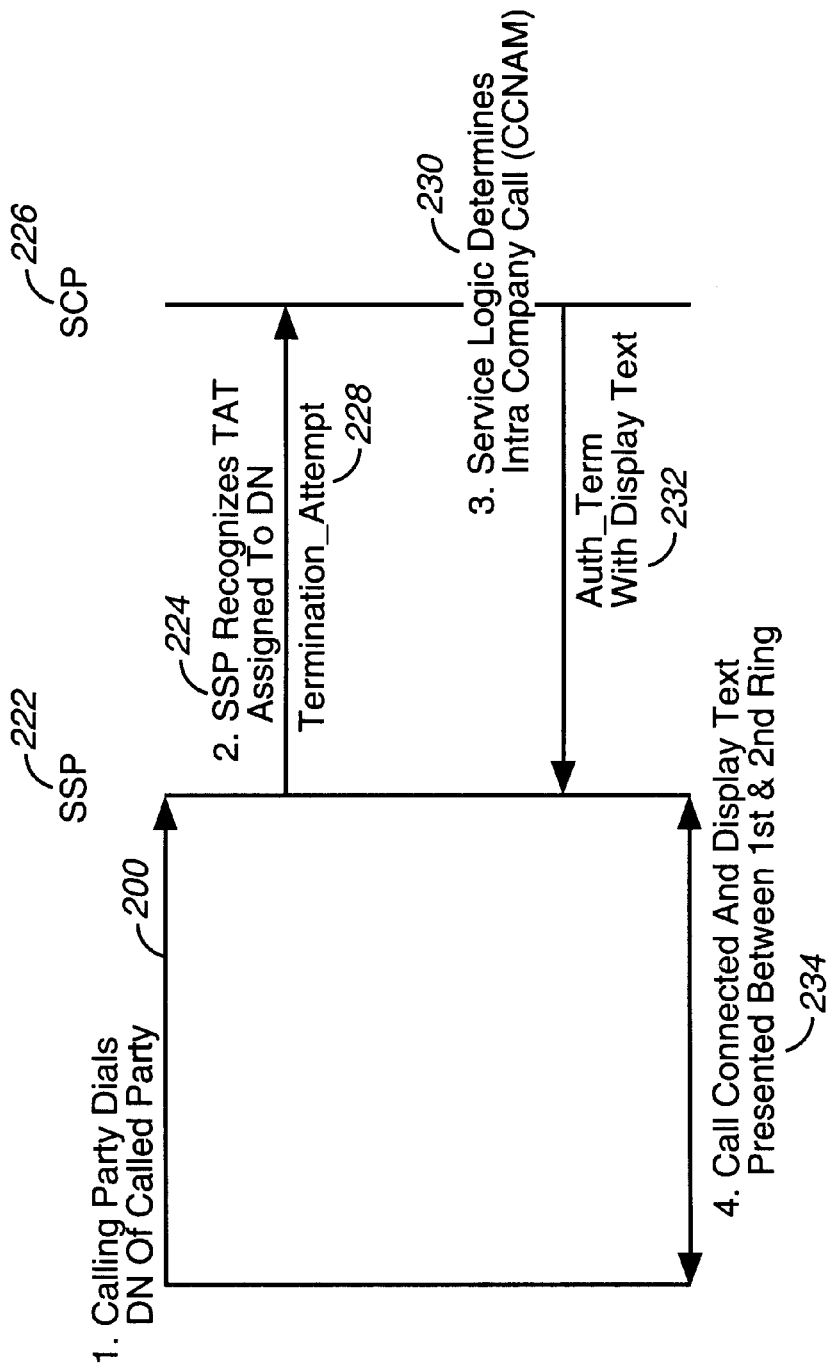
FIG. 11 is a call flow chart of a method of providing caller identification with name within a customer group in accordance with one embodiment of the invention.

FIG. 11 is a call flow chart of a method of providing caller identification with name within a customer group in accordance with one embodiment of the invention. The process starts when the calling party dials the DN (destination number) of the called party at step 200. The SSP 222 recognizes the TAT assigned to the DN at step 224. The SSP sends a termination attempt query to the SCP 226 at step 228. The service logic determines the call is an intracompany call and performs a CCNAM lookup at step 230. The SCP 226 sends an authorize termination command having display text at step 232. The call is connected by the SSP 222 and the display text is presented to the called party at step 234.

Thus there has been described a system and method of providing caller name information for calls within large corporations. The system and method works across multiple central offices.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of providing caller identification with name within a customer group, comprising the steps of:
   (a) dialing a destination telephone number;
   (b) receiving a call to the destination telephone at a service switching point and triggering;
   (c) sending a query to a switching control point;
   (d) determining if the destination telephone number subscribes to a custom caller identification with name service or to a caller identification with name service;
   (e) when the destination telephone number subscribes to custom caller identification with name service, performing a lookup in a custom caller identification with name database;
   (f) when the lookup returns a caller name, transmitting a response to the service switching point that includes the caller name;
   (g) terminating the call to the destination telephone number; and
   (h) forwarding the caller name to the destination telephone number.

2. The method of claim 1, further including the steps of:
   (i) when the lookup does not return the caller name, performing a caller identification with name lookup;
   (j) sending a response with a customer group name to the service switching point.

3. The method of claim 2, wherein step (h) further includes the step of:
   (i1) when the calling party director number is not in the customer caller identification with name database, performing the caller identification with name lookup.

4. The method of claim 2, wherein step (i) further includes the step of:
   (i1) when the calling party director number is unknown, performing the caller identification with name lookup.

5. The method of claim 1, wherein step (a) further includes the step of dialing from a telephone number in the customer group.

6. The method of claim 1, wherein step (b) further includes the steps of:
   (b1) receiving the call at a destination service switching point;
   (b2) executing a termination attempt trigger based on the destination telephone number.

7. The method of claim 1, wherein step (e) further includes the steps of:
   (e1) determining if the destination telephone number has a custom calling name subscription;
   (e2) when the destination telephone number has the custom calling name subscription, determining a customer group based on the destination telephone number.

8. The method of claim 7, further including the steps of:
   (e3) performing a lookup on a partition of the custom caller identification with name database associated with the customer group.

9. The method of claim 1, wherein step (a) further includes the step of:
   (a1) entering a plurality of user names associated with a plurality of telephone numbers in the customer group.

10. A method of providing a caller identification with name service, comprising the steps of:
    (a) receiving a call at a terminating service switching point to a terminating directory number;
    (b) triggering based on the terminating directory number and sending a query to a switching control point;
    (c) determining if the terminating directory number and the originating directory number are both part of a customer group;
    (d) when the terminating directory number and the originating directory number are both part of the customer group, performing a lookup; and
    (e) forwarding a caller name to a destination telephone.

11. The method of claim 10, further including the steps of:
    (f) when the terminating director number and the originating directory number are not both part of the customer group, forwarding an organization name to the destination telephone.

12. The method of claim 10, wherein step (c) further includes the steps of:
    (c1) determining if the terminating directory number has a custom calling name subscription;
    (c2) when the destination telephone number has the custom calling name subscription, determining a customer group based on the destination telephone number.

13. The method of claim 12, further including the step of:
    (c3) performing a lookup on a partition of a custom caller identification with name database associated with the customer group.

14. The method of claim 12, further including the steps of:
    (c3) when the destination telephone number does not have the custom calling name subscription, performing a lookup on a calling identification with name database.

15. The method of claim 13, further including the step of:
    (c4) when the lookup on the partition of the custom caller identification with database does not find a calling destination number, sending a response with a customer group name.

16. The method of claim 13, further including the step of:
    (c4) when the lookup on the partition of the custom caller identification with database does not find a name associated with the calling destination number, sending a customer group name.

17. A method of providing caller identification with name within a customer group, comprising the steps of:
    (a) dialing a terminating telephone number;
    (b) receiving a call to the terminating telephone at a terminating service switching point;
    (c) executing a termination attempt trigger at a terminating service switching point;
    (d) sending a termination attempt query to a switching control point from the terminating service switching point;
    (e) determining if the terminating telephone number has a custom calling name subscription;

(f) when the terminating telephone number does have the custom calling name subscription, performing a lookup in a custom caller identification with name database;

(g) when the lookup returns a caller name, transmitting a response to the service switching point that includes the caller name;

(h) terminating the call to the destination telephone number;

(i) forwarding the caller name to the destination telephone number;

(j) when the lookup does not find an originating telephone number, performing a caller identification with name lookup; and (k) sending a response with a customer group name to the service switching point.

* * * * *